(12) United States Patent
Lee (10) Patent No.: US 9,491,427 B2
(45) Date of Patent: Nov. 8, 2016

(54) METHOD AND APPARATUS FOR RECORDING VIDEO IMAGE IN A PORTABLE TERMINAL HAVING DUAL CAMERA

(71) Applicant: Samsung Electronics Co., Ltd., Gyeonggi-do (KR)

(72) Inventor: Yohan Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/134,083

(22) Filed: Dec. 19, 2013

(65) Prior Publication Data

US 2014/0178027 A1   Jun. 26, 2014

(30) Foreign Application Priority Data

Dec. 21, 2012   (KR) ......................... 10-2012-0150304

(51) Int. Cl.
| | | |
|---|---|---|
| *H04N 5/77* | (2006.01) | |
| *H04N 9/44* | (2006.01) | |
| *G11B 27/10* | (2006.01) | |
| *H04N 21/414* | (2011.01) | |
| *H04N 21/4223* | (2011.01) | |
| *H04N 5/232* | (2006.01) | |
| *H04N 5/247* | (2006.01) | |
| *H04N 5/775* | (2006.01) | |
| *H04N 9/82* | (2006.01) | |

(52) U.S. Cl.
CPC ................. *H04N 9/44* (2013.01); *G11B 27/10* (2013.01); *H04N 5/23216* (2013.01); *H04N 5/247* (2013.01); *H04N 5/77* (2013.01); *H04N 5/775* (2013.01); *H04N 9/8211* (2013.01); *H04N 21/41407* (2013.01); *H04N 21/4223* (2013.01)

(58) Field of Classification Search
CPC .. H04N 21/41407; H04N 5/247; H04N 9/44; H04N 5/23216; H04N 5/775; H04N 21/4223; H04N 5/77; H04N 9/8211; G11B 27/10
USPC ........................................................ 386/224
See application file for complete search history.

(56) References Cited

U.S. PATENT DOCUMENTS

| | | | |
|---|---|---|---|
| 2005/0190279 A1* | 9/2005 | Nobels ..................... | 348/333.02 |
| 2011/0010497 A1* | 1/2011 | Bryant-Rich et al. ........ | 711/115 |
| 2012/0147204 A1* | 6/2012 | Jeong et al. ............. | 348/211.11 |
| 2013/0335340 A1* | 12/2013 | Smith .......................... | 345/173 |

FOREIGN PATENT DOCUMENTS

| | | |
|---|---|---|
| EP | 2 627 073 A1 | 8/2013 |
| JP | 2011-250340 A | 12/2011 |
| KR | 10-2007-0117284 A | 12/2007 |

* cited by examiner

*Primary Examiner* — William Tran
(74) *Attorney, Agent, or Firm* — Cha & Reiter, LLC (57) ABSTRACT

A method for recording video is provided that includes outputting a first video stream captured by a first camera of portable terminal; entering into a comment recording mode while the first video stream is being captured; while in the comment recording mode: outputting the first video stream concurrently with a second video stream that is captured by a second video camera of the portable terminal, and generating sync data for a future synchronization of the first video stream with the second video stream; and exiting the comment recording mode and storing the generated sync data in a memory.

16 Claims, 7 Drawing Sheets

METHOD AND APPARATUS FOR RECORDING VIDEO IMAGE IN A PORTABLE TERMINAL HAVING DUAL CAMERA

CLAIM OF PRIORITY

This application claims the benefit under 35 U.S.C. §119 (a) of a Korean patent application filed on Dec. 21, 2012 in the Korean Intellectual Property Office and assigned Serial No. 10-2012-0150304, the entire disclosure of which is hereby incorporated by reference.

BACKGROUND

1. Field of the Disclosure

The present disclosure relates to portable terminals and more particularly to a method and apparatus for recording video image in a portable terminal.

2. Description of the Related Art

Portable terminals, such as smart phones and tablet PCs, are popularly used. Ordinarily, a portable terminal is equipped with a dual camera disposed at the front and rear sides of the portable terminal. A user can record video by using either one of the front and rear cameras. If the user wants to add commentary to the video, the user can utilize a microphone that is part of the portable terminal to capture the user's voice. However, in this case only the user's voice would be heard in the video while the user's face remains hidden. Alternatively, the user may occasionally aim the camera at him or her when providing the commentary in order to add images of the user's face as part of the video. However, in such instances, images of the subject cannot be recorded while the user is filming his own face and the focus of the video is likely to become unstable due to the changing direction of the camera.

Accordingly, new techniques are needed for adding user commentary to a video that is being recorded.

SUMMARY

The present disclosure provides a method for recording a video image and a portable terminal thereof enabling recording a subject image and a photographer image simultaneously by identifying an input of the photographer's voice comment.

In one aspect of the disclosure, a method for recording video by a dual-camera portable terminal is provided, comprising: outputting a first video stream captured by a first camera of the portable terminal; entering into a comment recording mode while the first video stream is being captured; while in the comment recording mode: outputting the first video stream concurrently with a second video stream that is captured by a second video camera of the portable terminal, and generating sync data for a future synchronization of the first video stream with the second video stream; and exiting the comment recording mode and storing the generated sync data in a memory.

In another aspect of the disclosure, an apparatus for capturing video is provided, comprising: a first camera for capturing a first video stream; a second camera for capturing a second video stream; a memory; and a processor configured to: output the first video stream; enter into a comment recording mode while the first video stream is being captured; while in the comment recording mode: output the first video stream concurrently with the second video stream and generate sync data for a future synchronization of the first video stream with the second video stream; and exit the comment recording mode and store the generated sync data in the memory.

BRIEF DESCRIPTION OF THE DRAWINGS

The features and advantages of the present disclosure will be more apparent from the following detailed description in conjunction with the accompanying drawings, in which.

DETAILED DESCRIPTION

Hereinafter, examples of the present disclosure are described in detail with reference to the accompanying drawings. The same reference symbols are used throughout the drawings to refer to the same or like parts. Detailed descriptions of well-known functions and structures incorporated herein may be omitted to avoid obscuring subject matter that is considered more pertinent. For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

Figure 1:
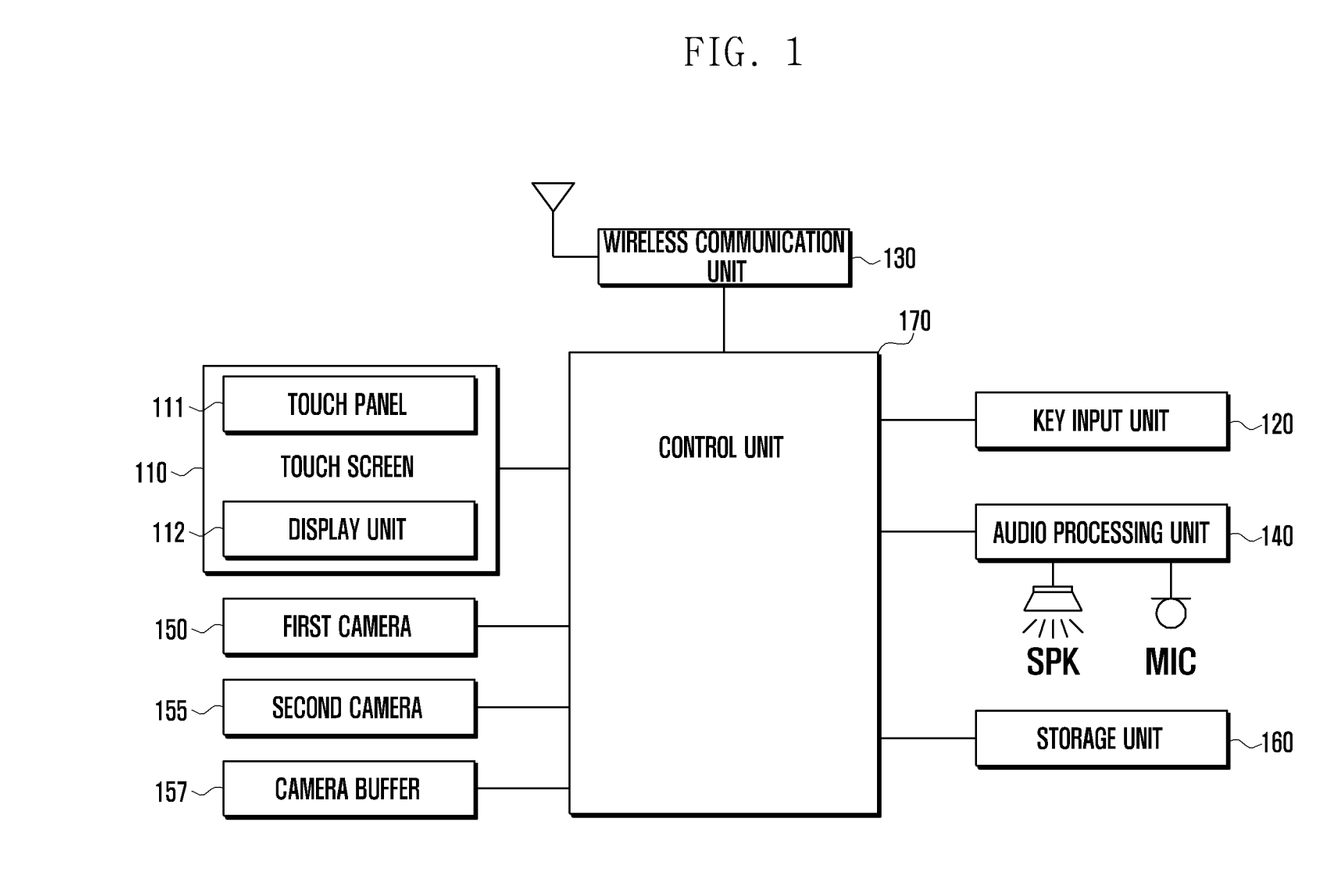
FIG. 1 is a block diagram of a portable terminal, in accordance with aspects of the disclosure.

FIG. 1 is a block diagram showing a configuration of a portable terminal 100 having a dual camera, according to aspects of the disclosure. The portable terminal according to the present disclosure may include a mobile phone, smart phone, tablet PC, hand-held PC, PMP (Portable Multimedia Player), or PDA (Personal Digital Assistant). Further, the portable terminal according to aspects of the disclosure may provide a multi-tasking function for executing a plurality of tasks at the same time.

As illustrated, the portable terminal 100 according to aspects of the disclosure includes a touch screen 110 configured with a touch panel 111 and a display unit 112, key input unit 120, wireless communication unit 130, audio processing unit 140, first camera 150, second camera 155, storage unit 160, and control unit 170.

The touch screen 110 includes a touch panel 111 and a display unit 112. The touch screen displays a screen according to the execution of a user function, and detects a touch event related to the control of the user function.

The touch panel 111 is placed on the display unit 112. The touch panel 111 may be an add-on type of touch panel that is located in front of the display unit 112, or an on-cell or in-cell type of touch panel which is inserted into the display unit 112. The size of the touch screen may be decided according to the size of touch panel. The touch panel 111 generates an analog signal (for example, touch event) responding to a user input information (for example, user gesture) of the touch panel 111, and transmits to the control unit 170 by converting the analog signal to a digital signal. Here, the touch event includes touch coordinates (X, Y) information. If a touch event is received from the touch screen 110, the control unit 170 identifies a touch mechanism (for example, finger or pen) that performed the touch and detects when the touch is released. Further, if the touch coordinates change, the control unit 170 identifies that a touch position has moved, and calculates a change amount of the touch position and a speed of touch movement responding to the movement of the touch. The control unit 170 identifies a user gesture based on the touch coordinates, occurrence or release of touch, movement of touch, change amount of touch position, and speed of touch movement. The user gesture may include a touch, multi-touch, tap, double tap, long tap, tap and touch, drag, flick, press, long press, pinch in, and pinch out. Further, the touch screen has a pressure sensor, and thereby can detect a pressure that is exerted at position in the touchscreen that is touched. The detected pressure information is transmitted to the control unit 170 and in some instances, may be classified as a touch and a press. The touch panel 111 may be a resistive type, capacitive type, electromagnetic induction type, and/or any other suitable type of touch panel.

The display unit 112 displays image data received from the control unit 170. Namely, according to the usage of portable terminal, the display unit 112 may provide various screens such as a locking screen, home screen, application (hereafter, abbreviated to "App") execution screen, menu screen, keypad screen, message editing screen, and internet screen. The display unit 112 may be formed in a flat display unit such as an LCD (Liquid Crystal Display: LCD), OLED (Organic Light Emitted Diode), and AMOLED (Active Matrix Organic Light Emitted Diode).

The display unit 112, according to the present disclosure, may display a first image collected by one of a first camera and a second camera in an image recording mode. If a request for starting to record a comment image is detected while recording a moving image, the display unit 112 may display a second image collected by the other camera in a specific area of displayed first image. For example, the display unit 112 according to aspects of the disclosure displays a second image in a specific area of first image, if the control unit identifies a user voice or a touch input while displaying the first image. In this case, the first image is displayed in a main area of the display unit 112 and the second image is displayed in a sub-area of the display unit 112, however the present disclosure is not limited to this. The main area and sub-area of the display unit may be displayed though different layers or through a single layer, in some implementations.

The key input unit 120 inputs numeral or character information, and includes a plurality of input keys and function keys for setting various functions. The function keys may include direction keys (e.g. left arrow, right arrow, etc.), side keys, and shortcut keys. Further, the key input unit 120 generates a key signal related to user setting and function control of the portable terminal 100, and transmits it to the control unit 170. The key signal may include one or more of a power on/off signal, volume control signal, and screen on/off signal. The control unit 170 may control the components of the portable terminal responding to the key signal. Further, the key input unit 120 may include a plurality of keys such as a QWERTY keypad, 3×4 keypad, and 4×3 keypad. If the touch panel 111 of the portable terminal 100 supports a full touch screen, the key input unit 120 may include only one of a screen on/off key and portable terminal on/off key formed at a side of the case of the portable terminal 100.

The wireless communication unit 130 performs a communication function of the portable terminal. The wireless communication unit 130 performs voice communication, video communication, and data communication by forming a communication channel set to a supportable mobile communication network. The wireless communication unit 130 may include a wireless transmitter and/or a wireless receiver. Further, the wireless communication unit 130 may include a mobile communication module (for example, 3rd-generation mobile communication module, 3.5th-generation mobile communication module, or 4th-generation mobile communication module), and digital broadcast module (for example, DMB module).

The audio processing unit 140 transmits audio data such as a voice received from the control unit 170 to a speaker SPK by converting a digital signal to an analog signal, and transmits audio data such as a voice received from a microphone to the control unit 170 by converting an analog signal to a digital signal. The audio processing unit 140 may be configured with a codec (coder/decoder), and the codec may have a data codec for processing packet data and an audio codec for processing an audio signal such as voice. The audio processing unit 140 plays an audio signal through the speaker SPK by converting a digital audio signal to an analog audio signal through the audio codec. The audio processing unit 140 transmits an analog audio signal input by the microphone to the control unit 170 by converting to a digital audio signal through the audio codec.

The microphone, according to one aspect of the disclosure, collects an audio signal from surroundings in an image recoding mode. The control unit 170 analyzes the audio signal collected by the microphone, and identifies a starting time of speech and an ending time of speech by a user voice. In addition, in some instances, the control unit 170 may process audio that is captured by the microphone by using an audio processing technique to determine whether the audio is a human voice or otherwise includes a predetermined characteristic.

The first camera 150 and second camera 155 may be disposed on different sides of the portable terminal. If one of the first camera 150 and second camera 155 is disposed at the front side of the terminal (e.g., the side where the touch screen is located), the other one of the first camera 150 and the second camera 155 may be disposed in the rear side of the terminal (e.g., the side that is opposite to the front side). For example, the first camera 150 may be disposed at the rear side of the portable terminal and have a first resolution and the second camera 155 may be disposed at the front side of the portable terminal and have a second resolution that is lower than the first resolution. The first camera 150 and second camera 155 may be activated by touching the touch screen 110 or the key input unit 120.

According to aspects of the disclosure, the first camera 150 and second camera 155 may include a camera sensor for converting an input light signal to an electric signal, an ISP (Image Signal Processor) for converting an analog signal generated by the camera sensor to digital data, and a DSP (Digital Signal Processor) for processing (for example, scaling, noise reduction, and RCG signal conversion) the digital data output by the ISP to display in a touch screen. Here, the camera sensor may be a CCD (Charge-coupled Device) sensor or a CMOS (Complementary Metal-Oxide Semiconductor) sensor, and/or any other suitable type of sensor. In some instances, only the DSP may be used by omitting the ISP.

A camera buffer 157 may be used to temporarily store image data collected by the first camera 150 and second camera 155. The image data temporarily stored in the camera buffer 157 may include a still image that is captured by the cameras or video that is being captured by one of the cameras. For example, if image recording is started, the control unit 170 extracts data that is fed by one of the first camera 150 and second camera 155 into the camera buffer 157, and transfers that data from the camera buffer to the storage unit 160.

The storage unit 160 may include any suitable type of volatile and/or non-volatile memory, such as a Random Access Memory (RAM), a solid state drive (SSD), a flash memory, or a Read-Only Memory, EEPROM memory. In some implementations, the storage unit 160 may be configured to store an OS (Operating System) and various applications (hereafter, Apps) of the portable terminal 100, and various data generated by the portable terminal 100. The data may include data generated by applications that are executed on the portable terminal and all the types of data generated by using the portable terminal and received from the outside (for example, external server, another portable terminal, and personal computer). The storage unit 160 may store diversified setting information of user interface provided by the portable terminal and processing of portable terminal functions.

In particular, the storage unit 160 according to aspects of the disclosure may store a voice recognition program. The voice recognition program is used for identifying a speech starting time and a speech ending time of a user by analyzing an audio signal collected through the microphone of the terminal 100. In that regard, the storage unit 160 may store various statistic models, results of voice recognition, and condition of starting voice recognition related to the voice recognition program. The voice recognition program may be implemented as processor-executable instructions that are executed by the control unit 170 (or other electronic circuitry), and/or as a combination of hardware and software.

The control unit 170 may include an ARM-based processor, an x86-based processor, a MIPS-based processor, and/or any other suitable type of electronic circuitry. In some implementations, the control unit 170 may control the general operation of the portable terminal 100 and signal flows between internal components of the portable terminal. Furthermore, in some implementations, the control unit 170 may perform one or more data processing functions. Moreover, the control unit 170 controls a power supply from a battery to internal components of the portable terminal 100. If a power is supplied, the control unit 170 controls a booting process of the portable terminal 100, and executes various application programs stored in a program area to perform functions of the portable terminal 100 according to user settings.

It should be noted that in some instances, the portable terminal 100 may further include components not described above, such as a sensor module for detecting information related to movements of the portable terminal 100, and a GPS module for measuring the location of the portable terminal 100. Further, the portable terminal 100 according to aspects of the disclosure may omit specific components. Further, the input unit according to aspects of the disclosure may include components such as a touch pad and a track ball beside the touch screen 110 and key input unit 120.

Figure 2:
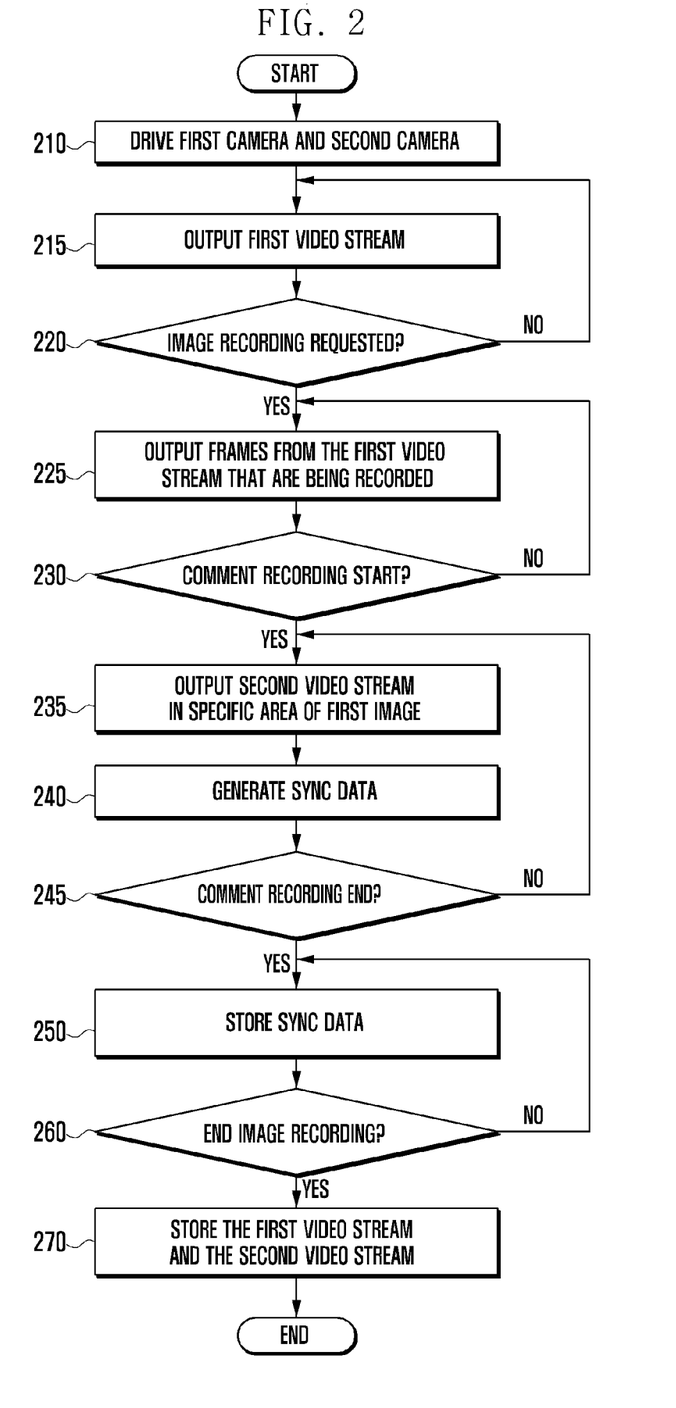
FIG. 2 is a flowchart of a process for recording video by the portable terminal, in accordance with aspects of the disclosure.

FIG. 2 is a flowchart of a process for recording video by using both the first camera 150 and the second camera 155 of the portable terminal 100, in accordance with aspects of the disclosure. According to the process, the control unit 170 activates the first camera 150 and second camera 155 in response to a user instruction (210). The instruction may be provided by using a camera execution key or a camera selection unit (not shown). Next, the control unit 170 starts outputting a first video stream captured by the first camera on the display unit 112 (215). In some implementations, the control unit 170 stores the first video stream that it is continuously supplied by the first camera 150 in the camera buffer 157. Because the second camera 155 is also driven, the control unit 170 may store a second video stream captured by the second camera 155 in the camera buffer 157. As noted above, the first camera may capture video of a subject located on the rear side of the portable terminal and the second camera may capture video of a photographer, who is presumably located on the front side of the portable terminal, while he or she is using the portable terminal to record the images of the subject. The video may be captured at 30 fps (frame per sec) or more (for example, 60 fps), however the present disclosure is not limited to any particular frame rate.

The control unit 170 determines whether an image recording request signal is detected (220). If an image recording request signal is detected, the control unit 170 starts displaying frames from the first video stream that are being recorded on the display unit 112. (225).

The control unit 170 determines whether a comment recording is to be started (230). In some implementations, the control unit 170 may determine that a comment recording is to be started if an audio signal received from the microphone of the portable terminal 100 is identified as a human voice having a predetermined characteristic. Additionally or alternatively, in some implementations, the control unit 170 may determine that a comment recording is to be started if a touch input signal is received from the touch screen 110 while the first video stream is being recorded. In some implementations, the control unit 170 may start recording a comment only when an audio signal is captured by the microphone of the terminal 100 possesses a predetermined characteristic. By way of example, the control unit 170 may start the comment recording when the photographer's voice is first captured by the microphone. The control unit 170 may identify whether an audio signal captured by the microphone includes the photographer's voice by analyzing the audio signal. For instance, the control unit 170 may recognize the audio captured by the microphone of the terminal 100 as the photographer's voice if the audio signal captured by the microphone is higher than a predetermined decibel (dB) level or comprises a specific frequency band. However, it should be noted that the present disclosure is not limited to these voice recognition techniques. If a photographer's voice is recognized, the control unit 170 may identify the starting time of voice recognition as a starting time of photographer's speech and may store an indication of this time in memory. Further, if the comment recording is started in response to a touch input signal, the time at which the touch input signal is received may be identified as a starting time of the photographer's speech.

Figure 3:
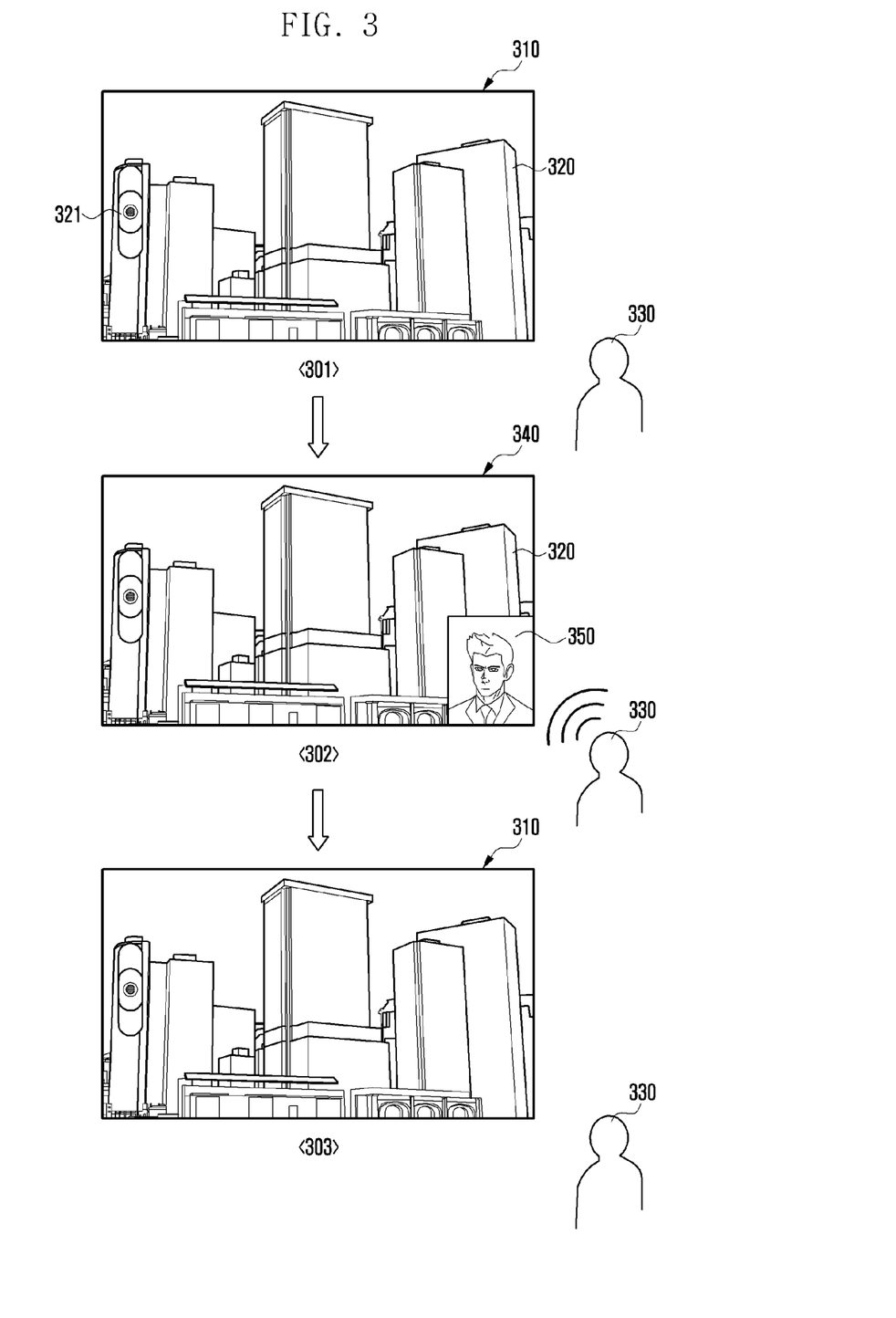
FIG. 3 and FIG. 4 are schematic diagrams of screens that are displayed by the portable terminal when the portable terminal is in a comment recording mode, in accordance with aspects of the disclosure.

If it is determined to start recording a comment, the control unit 170 enters a comment recording mode (235). When in the comment recording mode, the control unit 170 outputs on the display unit 112 frames from the first video stream and frames from the second video stream, such that the frames from the second video stream are smaller in size and superimposed over a specific portion of the frames from the first video stream. Thus, in case that the photographer wants to record video of himself or herself commenting while recording video of the subject, the comment recording mode may include outputting a two viewer screen in the display unit that displays the frames from the first video stream (captured by the first camera 150) and frames from the second video stream (captured by the second camera 155) at the same time. In some implementations, the control unit 170 may output the frames from the first video stream in a main area of the display unit 112 and the frames in the second video stream in a sub-area of the display unit 112, however the present disclosure is not limited to this. Additionally or alternatively, in some implementations, the control unit 170 may output the first image and second image in areas having different sizes according to the user's control, for example, ratio 50:50 or ratio 70:30. Further, in some implementations, the control unit 170 may output the frames from the first video stream and the second video stream by merging two counterpart frames (e.g., as shown in FIG. 3), one from each of the two streams, into a single image layer before displaying the image layer on the display unit 112. Alternatively, the frames from the first video stream and the frames from the second video stream may be displayed as different layers by rending the frames from the second video stream on top of the frames from the first video stream.

The control unit 170 generates sync data while outputting the second video stream (240). In detail, the control unit 170 generates sync data for synchronizing the second image data with the first image data. According to the embodiment of the disclosure, the control unit 170 link at least one of the first video stream and the second video stream with the sync data. For example, the sync data may include information for outputting the second video stream concurrently with the first video stream. Thus, the sync data may include information that can be used to synchronize at least one of video and audio from the first video stream with at least one of video and audio from the second video stream. By way of example, in some implementations, for a first frame in the first video stream, the sync data may indicate a second frame in the second video stream that is required to be superimposed over the first frame when the first video stream and the second video stream are rendered concurrently on a two viewer screen (E.g., see FIGS. 3-4 and 6-7). Additionally or alternatively, in some implementations, the sync data may include the starting time of the photographer's speech (or the ending time of the photographer's speech). Additionally or alternatively, in some implementations, the sync data may include time information of generating second image data, starting frame information in generating the first image data, voice information, and touch input information, and/or any other suitable type of information.

Next, the control unit 170 determines whether the comment recording should be ended (245). For example, the control unit 170 may decide that the comment recording is to be ended when it is detected that audio of the photographer's voice has not been captured for a predetermined period of time by the microphone of the terminal 100 or when a user input is received via a user interface component of the terminal 100. In some implementations, the control unit 170 may identify whether the photographer has stopped speaking by analyzing an audio signal received from the microphone. For example, control unit 170 may terminate comment recording if the photographer's voice is not received for a predetermined period of time. The control unit 170 may identify the time when voice input was last received via the microphone as an ending time of the photographer's speech. Additionally or alternatively, in instances where user input from a user interface component is used to end the comment recording, the control unit 170 may identify the time of receiving the user input as an ending time of the photographer's speech. The ending time of the photographer's speech, as noted above, may also be used as sync data.

If it is determined that the comment recording is to be stopped, the control unit 170 stores any sync data that is generated at steps 210-245 and stops outputting frames from the second video stream on the display unit 112 while continuing to output frames from the first video stream (250). Additionally or alternatively, in some implementations, if it is determined that the comment recording is to be ended, the control unit 170 stops performing a sync data generation routine that is executed concurrently with the capturing of the first video stream and the second video stream while the terminal 100 is in the comment recording mode.

Figure 4:
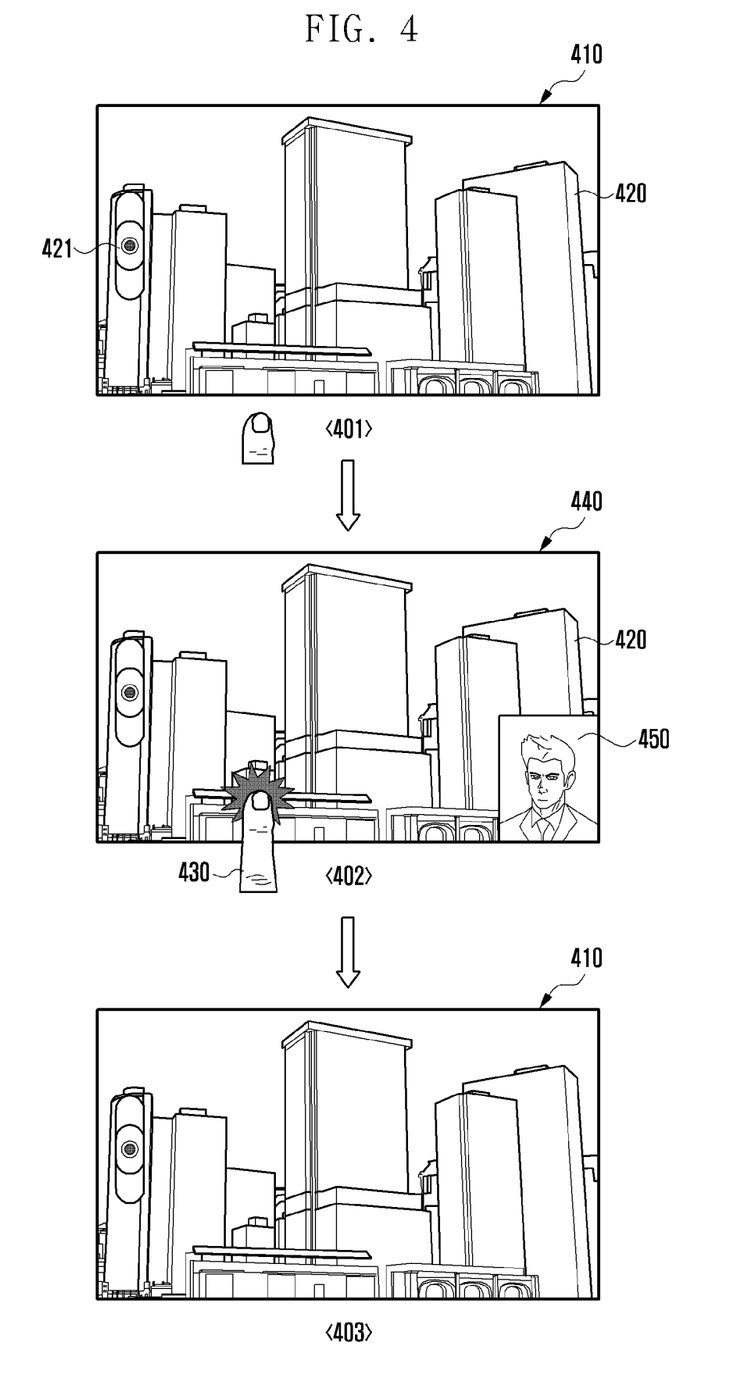

Next, the control unit 170 determines whether an input requesting the image recording to be ended is received (260). If an input requesting for ending image recording is detected, the control unit 170 stores in memory: all video data that is obtained from the first camera 150 as part of the first video stream, all video data that is obtained from the second camera 155 as part of the second video stream, and the sync data. (270) [The "linking" means a clock between the first video stream and the second video stream is synchronizing.] FIGS. 3 and 4 are schematic diagrams of screens that are displayed by the portable terminal 100 when the portable terminal 100 is in the comment recording mode. Referring to FIG. 3, the display unit 112 according to aspects of the disclosure outputs a one view screen 310 under the control of the control unit 170 in the image recording mode, as shown in Screen <301>. The one viewer screen 310 may include a first view area 320 for outputting video that is being (or can be) captured by the first camera (i.e., rear camera) and a camera shutter button 321. Even though it is not shown in the drawing, the viewer screen may further include a camera switching menu and a camera function setting menu. The camera switching menu maybe an icon for switching a front camera and rear camera. In this example, the size of the first view area 320 corresponds to a screen ratio (or screen size) of the display unit 112.

A photographer 330 may record a still image or video by selecting the camera shutter button 321. The photographer 330 can use the screen 310 as a viewfinder to control a vantage angle and composition of the subject that is to be filmed (e.g., the skyline of the city of Seoul). Furthermore, the photographer 330 may record his or her voice comments while recording a video of the subject. If a voice of the photographer 330 is detected while recording the video of the subject, the control unit 170 enters a comment recording mode and outputs a two viewer screen 340 as shown in Screen <302>. The two viewer screen 340 may include a first view area 320 for outputting frames from a first video stream that are being captured by the first camera and a second view area 350 for outputting frames from the second video stream that are being captured by the second camera. The first view area 320 may correspond to a main area and the second view area 350 may correspond to a sub-area. As illustrated, the second view area 350 may occupy only a portion of that portion of the display unit 112 that is occupied by the first view area 320. Additionally or alternatively, the second view area 350 may be superimposed over the first view area. The photographer 330 may view his/her own comment(s) through the second view area 350.

Furthermore, the control unit 170 may feed any audio signal that is captured by the microphone of the terminal 100 to a voice recognition engine that is part of the terminal 100. The voice recognition engine identifies whether a speech is started. The voice recognition engine eliminates noise in the audio signal, and may process the audio signal to determine whether it contains a human voice. If it is determined that the audio signal contains human voice, the voice recognition engine may provide the control unit 170 with an indication to that effect. The control unit 170 decides a starting time of the speech based on the identification of the voice recognition engine and outputs to a two viewer screen 340 of the display unit 112.

In this state, the photographer 330 may stop the voice comment. If the voice comment of the photographer stops, the control unit 170 exits the comment recording mode, enters the image recording mode again, and outputs the one viewer screen 310, as shown in Screen <303>.

In some implementations, the control unit 170 may continuously process audio signals by using the voice recognition engine while in the comment recording mode. If an audio signal identified as a human voice is not received for a predetermined time period, the voice recognition transmits an indication that a human voice has not been detected for for the predetermined period of time to the control unit 170. In response to the indication, the control unit 170 may exit the comment recording mode and output the one viewer screen 310 to the display unit 112.

Additionally or alternatively, if the portable terminal 100 according to one example detects that the photographer has started talking while video is being captured with the first camera 150, the portable terminal 100 may start recording a video of the photographer by using the second camera 155. Subsequently, if the photographer stops talking, the portable terminal 100 may stop capturing video with the second camera 150.

Referring to FIG. 4, the display unit 112 outputs a one viewer screen 410 under the control of the control unit 170 in an image recording mode. The viewer screen 410 is identical to the viewer screen 310. The control unit 170 outputs a first image collected by the first camera through the first view area 420.

The photographer may make a first touch on the touch screen 110 with a finger 430 while recording video with the first camera 150. Responsive to the first touch being detected, the control unit 170 identifies the time of first touch as a starting time of speech, and enters a comment recording mode. Next, the control unit 170 outputs a two viewer screen 440. The two viewer screen 440 is identical to the two viewer screen 340 of FIG. 3. The control unit 170 then outputs a second image collected by the second camera through the second view area 450. Namely, the photographer may view his/her comment image through the second view area 450.

The photographer may make a second touch on the touch screen 110 with a finger 430 to terminate the comment recording. If the second touch is detected, the control unit 170 identifies the time of the second touch as an ending time of speech, and exits the comment recording mode. The control unit 170 returns to the image recording mode, and outputs the one viewer screen 410 in the display unit 112 as shown in Screen <403>.

Stated succinctly, in the example of FIG. 4, the portable terminal 100 records a photographer image (by using the second camera 155) together with the photographer's voice if a touch is made through the touch screen 110 while video is being recorded the first camera 150. Subsequently, if the photographer touches again the touch screen 110, the terminal 110 stops the recording of video with the second camera 155 while continuing the recording with the first camera 155.

Figure 5:
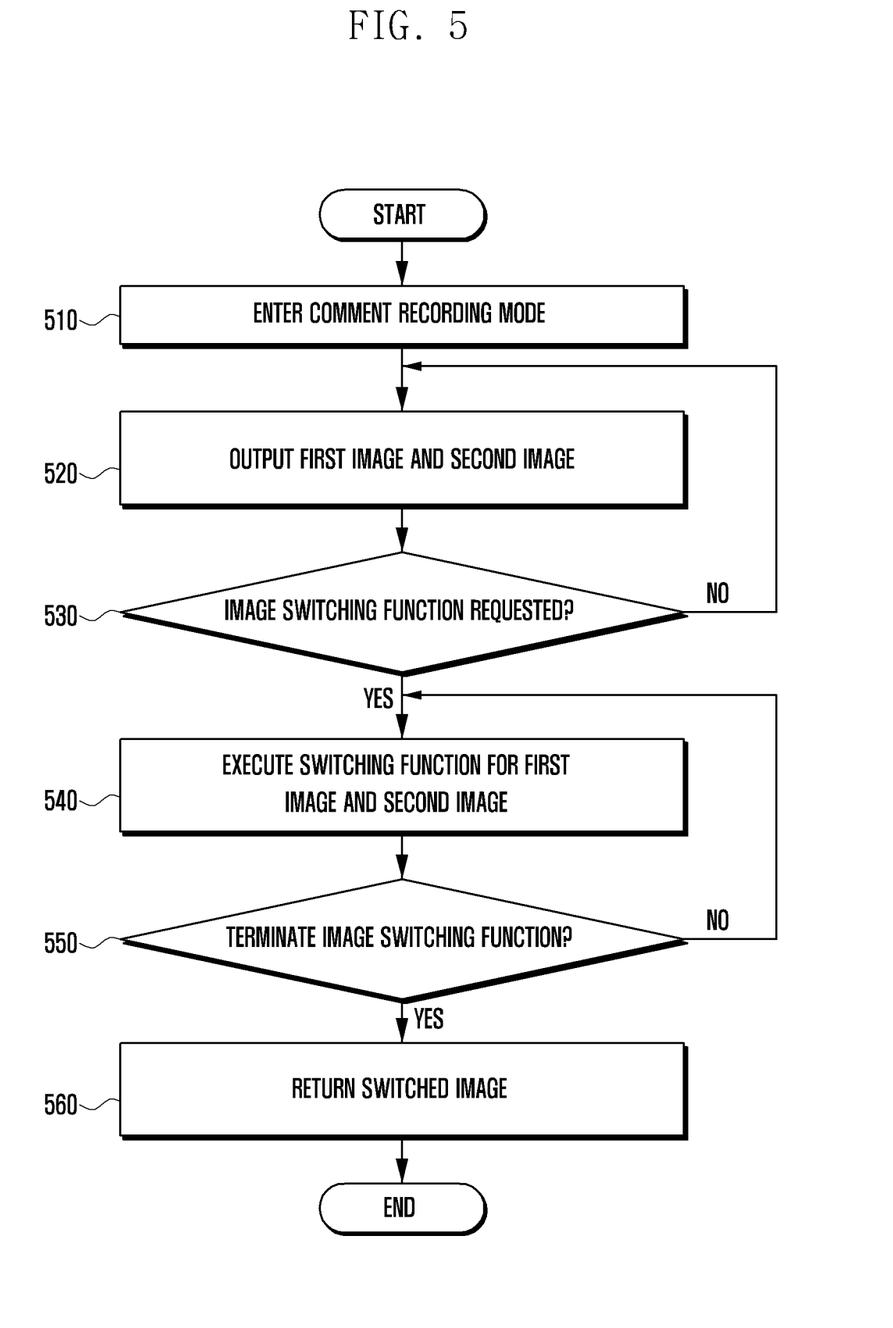
FIG. 5 is a flowchart of another process for recording video, in accordance with aspects of the disclosure.

FIG. 5 is a flow chart of a process for recording video in the portable terminal by using both the first camera 150 and the second camera 155, in accordance with aspects of the disclosure.

Referring to FIG. 5, the control unit 170 enters a comment recording mode according to a user's request signal while recording an image (510). When in comment recording mode, the control unit 170 may output a two-viewer screen in the display unit 112. The two viewer screen may include a first view area (for example, main area) outputting a preview image collected by the first camera 150 and a second view area (for example, sub-area) outputting a preview image collected by the second camera 155.

By entering the comment recording mode, the control unit 170 outputs a first image in the first view area of the display unit 112 and a second image in the second view area of the display unit 112 (520). For example, the control unit may control to output a first image in the main area of the display unit 112 and a second image in the sub-area of the display unit 112, however the present disclosure is not limited to this. The first image may be part of a first video stream that is captured by the first camera 150 and the second image may be part of a second video stream that is captured by the second camera 155. Thus, in this example, images from the first video stream may be displayed in the main area and images from the second video stream may be displayed in the sub-area.

In some implementations, the control unit may generate sync data for synchronizing the first image with the second image, however the present disclosure is not limited to this. For example, the control unit may generate the sync data, only if the first image and the second image are output in different superimposed layers. Further, the control unit may omit generating the sync data, if the first image and the second image are merged in the same layer.

The control unit may generate first image data and second image data by individually reading the first image and second image stored in a camera buffer at every frame, or may generate image data by merging the first image and the second image into a single frame (e.g., by superimposing the second image in the bottom right corner of the first image, as shown in FIGS. 3, 4, 6, and 7).

The control unit 170 identifies whether an image switching function is requested in the comment recording mode (530). If an audio signal received from the microphone is identified as a human voice or a touch input signal is received from the touch screen 110 in the comment recording mode, the control unit 170 may identify that a request for image switching function is detected. For example, the control unit 170 may determine that the image function is requested if the audio signal that is captured by microphone is a voice signal exceeding a predetermined decibel (dB) level, a voice signal having a specific frequency band, and/or having any other suitable audio signal characteristic. If the photographer's voice is successfully identified, the control unit 170 may recognize the identifying time of voice as a starting time of photographer's speech. If a touch input signal is received from the touch screen 110 in the comment recording mode, the control unit 170 may recognize the time of receiving a touch input signal as a starting time of photographer's speech.

If a request for the image switching function is detected, the control unit 170 executes the image switching function in response to the request (540). Executing the image switching function may include switching the manner in which the images captured by the cameras 150 and 155 are displayed, such that images from the first video stream are switched from being displayed in the main area to being displayed in the sub-area and images from the second video stream are switched from being displayed in the sub-area to being displayed in the main area. The image switching function is further discussed with to FIGS. 6 and 7.

Next, the control unit 170 determines whether a request for terminating the image switching function is detected (550). If a request for terminating the image switching function is detected, the control unit controls the switched images to return to their previous states (560). For example, the control unit may cause images from the first video stream to return to being displayed in the main area and images from the second video stream to return to being displayed in the sub area In some implementations, the request may be received via a control menu that is provided by the portable terminal. Additionally or alternatively, if the photographer's voice is not input for a predetermined period of time in the comment recording mode or a touch input is detected through the touch screen 110 after executing an image switching function, the control unit 170 may decide that a request for terminating the image switching function is detected. For example, the control unit 170 may identify whether the photographer's speech has ended by analyzing an audio signal received from the microphone. For example, if the photographer's voice is not detected for a predetermined period of time, the control unit 170 terminates the voice recognition.

Figure 6:
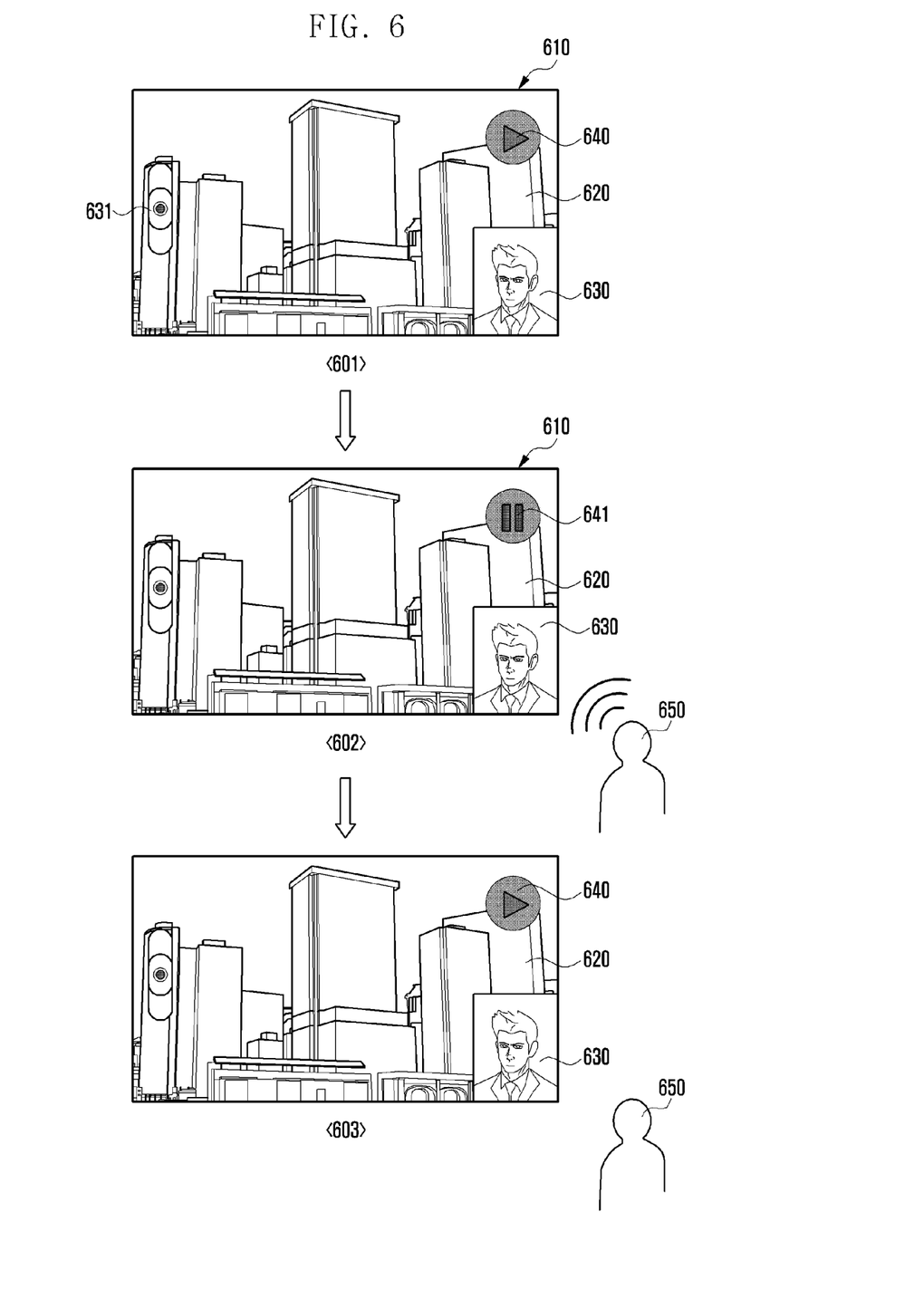
FIG. 6 and FIG. 7 are schematic diagrams of screens that are displayed by the portable terminal when the portable terminal is in the comment recording mode, in accordance with aspects of the disclosure.
Figure 7:
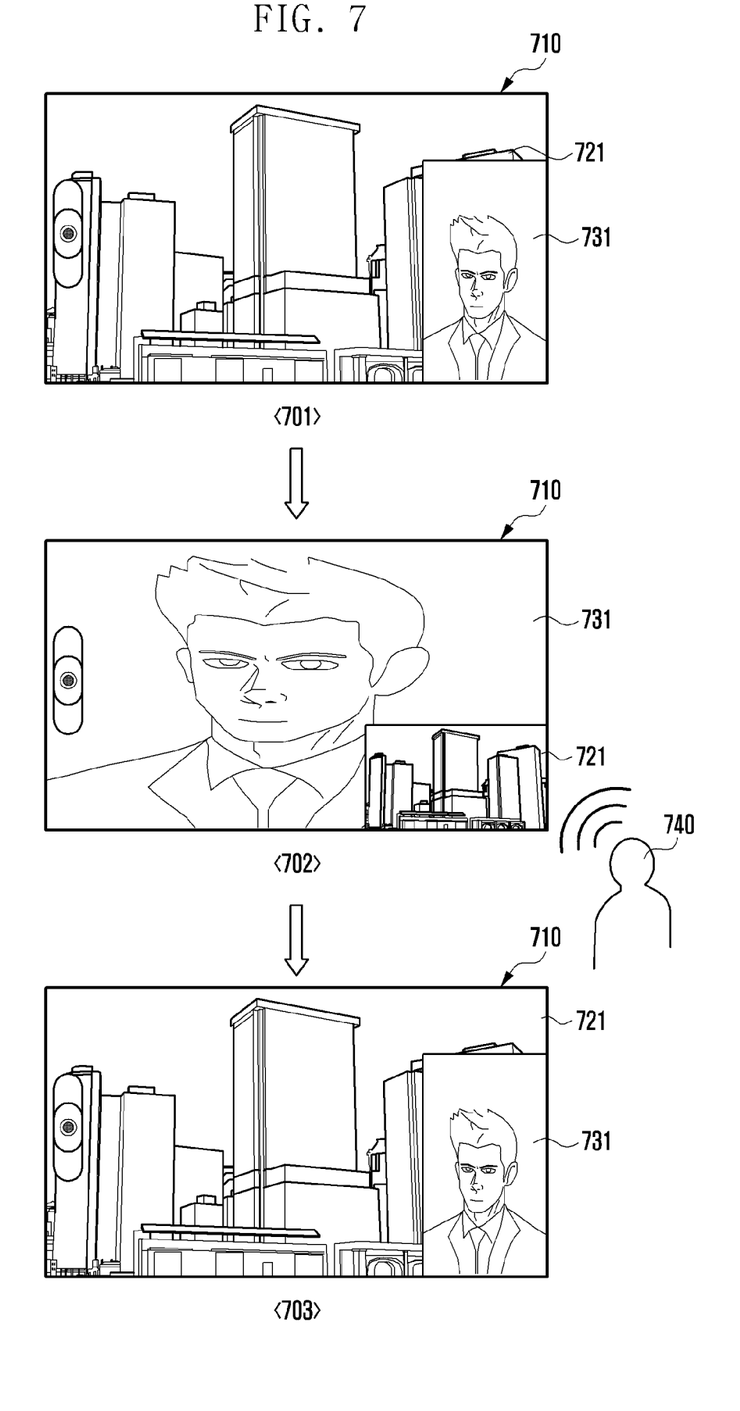

FIGS. 6 and 7 are schematic diagrams of screens that are displayed by the portable terminal 100 when the portable terminal 100 is in the comment recording mode, in accordance with aspects of the disclosure. Referring to FIG. 6, the display unit 112 according to aspects of the disclosure outputs a two viewer screen under the control of the control unit 170 in a comment recording mode as shown in Screen <601>. The two viewer screen 610 may include a first view area 620 for displaying frames of a first video stream that is captured by the first camera, second view area 630 for displaying frames from a second video stream that is captured by the second camera, and a camera shutter button 631. Even though it is not shown in FIG. 6, the two viewer screen 610 may further include a camera switching menu and a camera function setting menu. In this example, the second view area 630 may occupy only portion of the area of the display unit 112 that is occupy by the first view area 620. In some aspects, the first view area 620 may be regarded as a main area and the second view area 630 may be regarded as a sub-area.

The photographer 650 may comment with a voice to bring the photographer image into relief. If a voice of the photographer 650 is identified, the control unit 170 decides that a screen switching function (for example, still image display function) is requested. The control unit 170 stops refreshing the first view area 620 and begins displaying a frozen frame from the first video stream, as shown in Screen <602>. Namely, the control unit outputs a still image in the first view area 620 while outputting different frames from the second video stream in the second view area 630 as the different frames from the second video stream are being captured by the second camera 155. In this example, an object 641 indicating that the first view area is not being refreshed may be output in the first view area 620, however the present disclosure is not limited to this.

In more detail, the control unit 170 transmits an audio signal collected by the microphone in the comment recording mode to a voice recognition engine, and the voice recognition engine identifies a start of speech. If the collected audio signal is identified as a human voice, the voice recognition engine transmits the audio signal to the control unit 170. The control unit 170 decides a starting time of speech based on the identification of the voice recognition engine, and identifies a frame that was captured at the starting time of speech from the first image. The control unit 170 outputs the identified frame in the first view area 620 while outputting the second video stream continuously in the second view area 630.

In this state, the photographer 650 may stop talking. If the voice recognition engine detects that the photographer has stopped talking, the control unit 170 may return start outputting images from the first video stream in the first view area 620 while also outputting continuously images from the second video stream in the second view area, as shown in Screen <603>.

In some implementations, while the terminal 100 is in the comment recording mode, the control unit 170 may feed an audio signal captured by the microphone of the terminal 100 to the voice recognition engine. If an audio signal identified as a human voice is not received for a predetermined time, the voice recognition engine terminates the voice recognition and provides the control unit 170 with an indication that the photographer has stopped talking. The control unit 170 next identifies the time at which voice recognition is terminated as an ending time of speech, and exits the image switching function. The control unit 170 may then resume outputting different frames from the first video stream in the first view area 620. In some implementations, the first frame from the first video stream may be one that is captured at the ending time of speech.

Additionally or alternatively, in some implementations, while the portable terminal is in a state in which it outputs live frames from the first video stream in the first view area and a frozen frame from the second video stream in the second view area, if an image switching function is requested, the portable terminal may enter state in which it outputs a frozen frame from the first video stream in the first viewing area and different video frames from the second video stream in the second viewing area.

Referring to FIG. 7, the display unit 112 outputs a two viewer screen 710 in a comment recording mode as shown in Screen <701>. Detailed description on the two viewer screen 710 is same as the two viewer screen 610 of FIG. 6, and thereby omitted here. Here, the control unit 170 outputs a first image 721 of subject in a first view area and a second image 731 of photographer in a second view area in a comment recording mode.

In this state, the photographer 740 may start a voice input to output a photographer image in a main area. The control unit 170 then identifies a voice of photographer 740. If a voice is identified, the control unit 170 decides that a screen switching function (for example, view reversing function is requested. The control unit 170 outputs a first image 721 collected by the first camera in the second view area and a second image 731 collected by the second camera in the first view area. Namely, the control unit 170 controls to output a photographer image in a main area and a subject image in a sub-area.

In more detail, the control unit 170 feeds an audio signal collected by the microphone to a voice recognition engine, and the voice recognition engine identifies a start of speech. If a collected audio signal is identified as a human voice by eliminating noises, the voice recognition engine transmits the audio signal to the control unit 170. The control unit 170 decides a starting time of speech based on the identification of the voice recognition engine. Subsequently, the control unit 170 outputs a second image 731 of photographer inputting a voice in the first view area and a first image 721 of a subject in the second view area.

In this state, the photographer 740 may stop talking. When the photographer stops talking, the control unit 170 returns to the image switching function, and outputs again the first image data 721 in first view area and the second image data 731 in the second view area 730 as shown in Screen <703>.

In more detail, the control unit 170 continuously transmits an audio signal to the voice recognition engine in the comment recording mode. If an audio signal identified as a human voice is not received for a predetermined time, the voice recognition engine halts its operation and transmits an indication that human voice has not been received for the predetermined period of time to the control unit 170. The control unit 170 decides an ending time of voice recognition as an ending time of speech, and returns to the image switching function.

The portable terminal according to another example is not limited to the above functions, and may execute a view switching function or return according to a touch input in the comment recording mode. Further, while outputting a subject image in the first view area and a still image of photographer in the second view area, if a view switching function is requested, the portable terminal may output the photographer image in the first view area and a still image of subject in the second view area.

Although specific details have been described in detail hereinabove, it should be understood that many variations and modifications of the disclosed subject matter are possible. At least some of the steps presented with respect to FIG. 2 and FIG. 5 may be performed concurrently, performed in a different order, or altogether omitted. It is to be understood, that the various examples presented herein are not mutually exclusive and can be combined. For examples any of the examples presented with respect to FIGS. 3 and 4 may be combined with any of the examples presented with respect to FIGS. 6 and 7.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A method for recording video by a dual-camera portable terminal, comprising:
    outputting a first video stream captured by a first camera of the portable terminal in a first portion of a display of the portable terminal;
    detecting a first touch input in the first portion of the display of the portable terminal;
    in response to the detected first touch input in the first portion of the display of the portable terminal, capturing a second video stream of a user by a second camera of the portable terminal to output the first video stream in the first portion of the display of the portable terminal concurrently with a second video stream in a second portion of the display of the portable terminal that is smaller than the first portion and starting a comment recording mode, the second video stream including audio of a comment of the user that is recorded by a microphone as the second video stream is being captured by the second camera;
    detecting a second touch input in the first portion or the second portion of the display of the portable terminal;
    in response to the detected second touch input in the first portion or the second portion of the display of the portable terminal, stopping the outputting of the second video stream and recording a voice input of the user while maintaining the outputting of the first video stream; switching the portions of the display where the first video stream and the second stream are output, so that the first video stream starts being output in the second portion of the display and the second video stream starts being output in the first portion of the display.

2. The method of claim 1, wherein a comment recording mode is entered into based on one of a touch input and the voice input and the switching is performed based on another one of the touch input and the voice input.

3. The method of claim 1, wherein the comment recording mode is entered into based on audio captured by a microphone of the portable terminal having a predetermined characteristic.

4. The method of claim 3, wherein the predetermined characteristic includes at least one of the audio having a decibel level that falls within a predetermined decibel range or the audio including a predetermined set of frequencies.

5. The method of claim 3, wherein the comment recording mode is ended based on a microphone of the portable terminal failing to capture, for a predetermined period of time, audio having a predetermined characteristic.

6. The method of claim 1, wherein the comment recording mode is entered into based on receiving touch input at the portable terminal.

7. The method of claim 6, wherein the comment recording mode is exited based on receiving touch input at the portable terminal.

8. The method of claim 1, further comprising:
    storing the first video stream and the second video stream in a memory.

9. An apparatus for capturing video, comprising:
    a first camera for capturing a first video stream;
    a second camera for capturing a second video stream;

a microphone for recording audio;
a display unit;
a memory; and
a processor configured to:
outputting the first video stream in a first portion of the display unit;
in response to a detected first touch input in the first portion of the display unit, output the first video stream in the first portion of the display unit concurrently with the second video stream in a second portion of the display unit that is smaller than the first portion, and start a comment recording mode, the second video stream including a comment of a user that is recorded by the microphone as the second video stream is being captured by the second camera; and
in response to a detected second touch input in the first portion or the second portion of the display unit, stop the outputting of the second video stream and recording of a voice input of the user while maintaining the output of the first video stream; switch the portions of the display unit where the first video stream and the second stream are output, so that the first video stream starts being output in the second portion of the display unit and the second video stream starts being output in the first portion of the display unit.

10. The apparatus of claim 9, wherein the comment recording mode is entered into based on one of a touch input and the voice input and the switch is performed based on another one of the touch input and the voice input.

11. The apparatus of claim 9, wherein the comment recording mode is entered into based on audio captured by the microphone having a predetermined characteristic.

12. The apparatus of claim 11, wherein the predetermined characteristic includes at least one of the audio having a decibel level that falls within a predetermined decibel range or the audio including a predetermined set of frequencies.

13. The apparatus of claim 11, wherein the comment recording mode is ended based on the microphone failing to capture, for a predetermined period of time, audio having a predetermined characteristic.

14. The apparatus of claim 10, wherein the comment recording mode is entered into based on a touch input.

15. The apparatus of claim 11, wherein the comment recording mode is ended based on a touch input.

16. The apparatus of claim 9, wherein the processor is further configured to: store the first video stream and the second video stream in the memory.

* * * * *